No. 764,086. PATENTED JULY 5, 1904.
C. WASEK.
WATER BICYCLE BOAT.
APPLICATION FILED OCT. 5, 1903.
NO MODEL.
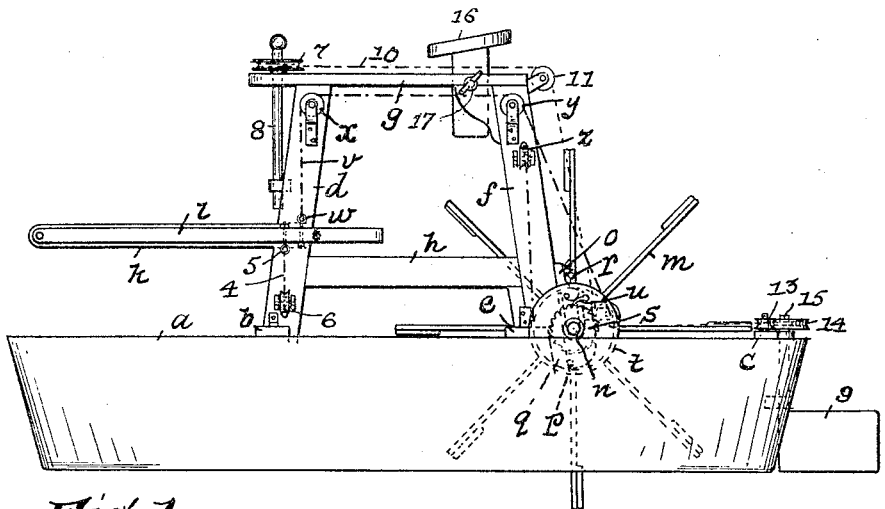
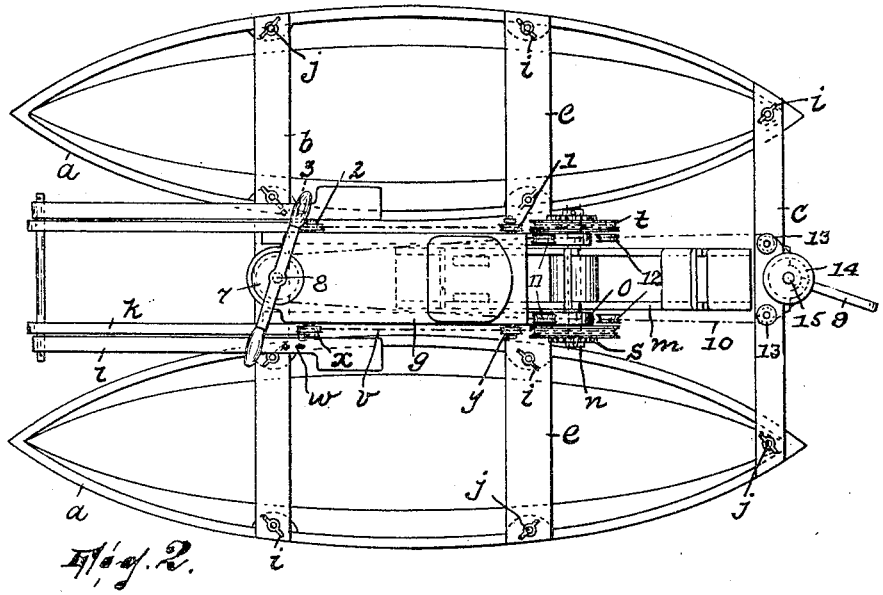
WITNESSES: Wm. S. Bell. Robert J. Pollitt.
INVENTOR, Carl Wasek,
BY Gartner & Steward,
ATTORNEYS.

No. 764,086. Patented July 5, 1904.

UNITED STATES PATENT OFFICE.

CARL WASEK, OF PATERSON, NEW JERSEY.

WATER-BICYCLE BOAT.

SPECIFICATION forming part of Letters Patent No. 764,086, dated July 5, 1904.

Application filed October 5, 1903. Serial No. 175,801. (No model.)

*To all whom it may concern:*

Be it known that I, CARL WASEK, a citizen of the United States, residing in Paterson, in the county of Passaic and State of New Jersey, have invented certain new and useful Improvements in Water-Bicycle Boats; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has for its object to provide an improvement in water-vehicles propelled by man-power.

The invention will be found fully illustrated in the accompanying drawings, wherein—

Figure 1 is a view in side elevation thereof, and Fig. 2 is a top plan view.

$a$ $a$ designates two boats or canoes. These boats are secured together in spaced relation by means principally of cross-ties $b$ and $c$. Certain framing now to be described and serving as a mount for the operator and to carry certain portions of the propelling mechanism coacts with these cross-ties to secure the boats together. On the cross-tie $b$ are fixed two uprights $d$, and on the adjacent ends of cross-pieces $e$, each of which spans only one boat, are fixed other uprights $f$. Uprights $d$ and $f$ are surmounted by a horizontal plate $g$. Said cross-pieces are furthermore joined by a brace $h$. The frame, comprising cross-tie $b$, cross-pieces $e$, uprights $d$ and $f$, plate $g$, and braces $h$, is removably secured to the boats by wing-nuts $i$, carried on studs $j$, projecting upwardly from the boats and penetrating the cross-tie and cross-pieces. Corresponding studs and wing-nuts secure the cross-tie $e$ to the boats.

$k$ designates forwardly-projecting arms carried by the uprights $d$. In the front ends of these arms are pivoted treadles $l$.

$m$ designates the paddle-wheel. Its shaft $n$ is journaled in blocks $o$, which are pivoted at $p$ in extensions $q$ of the lower ends of the uprights $f$. These blocks are pivoted so that the wheel may be removed, and they are held in position where they act as bearings for the shaft—that is to say, flat against uprights $f$—by wing-nuts $r$. On the ends of the shaft are fixed ratchets $s$, and between these ratchets and the uprights are loosely arranged on said shaft drums $t$. Said drums carry spring-actuated pawls $u$, engaging the ratchets.

$v$ is a flexible connection secured at one end to an eyelet $w$ on one of the treadles $l$, then passing up over a pulley $x$ on the adjoining upright $d$, then extending back over a pulley $y$ on the corresponding uprights $f$, then down around the corresponding drum $t$ several times, then up over a pulley $z$ in said upright $f$, across to a corresponding pulley (not shown) in the other upright, then down around the other drum $t$ several times, up over a pulley 1, arranged in the other upright $f$, then forward over another pulley 2, journaled in the other upright $d$, and then down to an eye 3 in the other treadle $l$.

4 is a flexible connection secured at its ends to corresponding eyes 5 in the under sides of the treadles $l$ and between said eyes, extending under pulleys 6 in the uprights $d$.

The arrangement of the flexible connections provides for transmitting the power from the treadles $l$ to the drums in such manner that said treadles act reversely to each other. The effect is that while one drum is caused to rotate in one direction the other will be working in the opposite direction—that is to say, while one is acting through its pawl to drive the ratchet, and hence the paddle-wheel, the other will be proceeding reversely to the point where its pawl will take a new grip on the corresponding ratchet-wheel.

7 is a steering-wheel carried on a shaft 8, journaled in the framing vertically, and 9 is the rudder, said steering-wheel and the rudder being geared together by an endless wire cable or chain 10, which is wound around the wheel, then extends back over pulleys 11, carried by the framing, then down under pulleys 12, and then back around pulleys 13 and the wheel 14, carried by the rudder-posts 15.

16 is the seat for the operator, the same being adjustably secured in the plate $g$ by a thumb-screw 17.

Having thus fully described my invention, what I claim as new, and desire to secure by Letters Patent, is—

In a water-vehicle, the combination of two boats, framing carried by said boats and securing the same in spaced relation, treadles carried by the framing, a propeller, a shaft for the propeller journaled in the framing, ratchets fixed on said shaft, trums loosely arranged on said shaft, spring-actuated pawls carried by said drums and engaging the ratchets, pulleys journaled in the frame, and a flexible driving means connected at its ends to said treadles and being continuous from one end to the other, said flexible means being between its ends, extended successively around said drums, and, between the drums, over said pulleys and a steering means, substantially as described.

In testimony that I claim the foregoing I have hereunto set my hand this 28th day of September, 1903.

CARL WASEK

Witnesses:
JOHN W. STEWARD,
JAMES B. NEWTON.